United States Patent [19]

Nose et al.

[11] Patent Number: 5,321,685
[45] Date of Patent: Jun. 14, 1994

[54] CANTILEVER TYPE PROBE, SCANNING TUNNEL MICROSCOPE AND INFORMATION PROCESSING APPARATUS USING THE SAME

[75] Inventors: Hiroyasu Nose, Zama; Kunihiro Sakai, Isehara; Toshimitsu Kawase, Atsugi; Toshihiko Miyazaki, Hiratuska; Katsuhiko Shinjo, Isehara; Yutaka Hirai, Tokyo; Takayuki Yagi, Machida; Katsunori Hatanaka, Yokohama; Keisuke Yamamoto, Yamato; Yuki Kasanuki, Machida; Yoshio Suzuki, Atsugi, all of Japan

[73] Assignee: Canon Kabushiki Kaisha, Tokyo, Japan

[21] Appl. No.: 979,453

[22] Filed: Nov. 20, 1992

Related U.S. Application Data

[63] Continuation of Ser. No. 770,335, Oct. 3, 1991, abandoned.

[30] Foreign Application Priority Data

Oct. 9, 1990 [JP] Japan .................. 2-269540

[51] Int. Cl.⁵ .............................................. G11B 9/00
[52] U.S. Cl. ............................ 369/126; 250/306; 250/310
[58] Field of Search ............... 369/101, 126; 365/151, 365/174; 250/306, 310, 305; 310/328, 330, 316, 318, 311; 73/862.64

[56] References Cited

U.S. PATENT DOCUMENTS

| | | | |
|---|---|---|---|
| 4,680,769 | 7/1987 | Miller | 372/50 |
| 4,747,650 | 5/1988 | Sakuda | 350/96.14 |
| 4,831,614 | 5/1989 | Duerig et al. | 369/101 |
| 4,880,975 | 11/1989 | Nishioka et al. | 250/306 |
| 4,904,045 | 2/1990 | Alferness et al. | 350/96.19 |
| 4,998,016 | 3/1991 | Nose et al. | 369/126 X |
| 5,047,637 | 9/1991 | Toda | 205/306 |
| 5,053,995 | 10/1991 | Kajimura et al. | 250/310 X |
| 5,075,548 | 12/1991 | Kajimura | 250/306 |
| 5,079,958 | 1/1992 | Tahase et al. | 73/862.64 |

FOREIGN PATENT DOCUMENTS

| | | |
|---|---|---|
| 1-179488 | 7/1989 | Japan . |
| 1-186695 | 7/1989 | Japan . |
| 2091836 | 3/1990 | Japan ........ 369/126 |
| WO89/07258 | 8/1989 | PCT Int'l Appl. . |

OTHER PUBLICATIONS

Review of Scientific Instruments, vol. 58, No. 8, Aug. 1, 1987, New York, pp. 1343–1348; B. L. Blackford et al.: "High Stability Bimorph Scanning Tunneling Microscope".

IEEE Electron Device Letters, vol. 10, No. 11, Nov. 1, 1989, New York, pp. 490–492; S. Akamine et al: "Microfabricated Scanning Tunneling Microscope".

Physical Review Letters, vol. 49, No. 1, Jul. 5, 1982, pp. 57–61; G. Binnig et al.: "Surface Studies By Scanning Tunneling Microscope".

Journal of Vacuum Science & Technology A, vol. 8, No. 1, Jan./Feb. 1990, pp. 317–318; T. R. Albrecht et al.: "Microfabrication of Integrated Scanning Tunneling Microscope".

*Primary Examiner*—Stuart S. Levy
*Assistant Examiner*—George J. Letscher
*Attorney, Agent, or Firm*—Fitzpatrick, Cella, Harper & Scinto

[57] ABSTRACT

A cantilever type probe comprising a piezoelectric bimorph cantilever containing a piezoelectric material provided between driving electrodes for driving a cantilever, a probe formed thereon and a drawing electrode for a probe provided along the surface where a probe is formed, wherein there is provided a shielding electrode for electrically isolating the probe and the drawing electrode from the driving electrodes.

4 Claims, 13 Drawing Sheets

|  | 2a | 2b | 4a | 4b |
|---|---|---|---|---|
| X DIRECTION | −Vx | +Vx | −2Vx | +2Vx |
| Y DIRECTION | +Vr | +Vr | +2Vr | +2Vr |
| Z DIRECTION | −Vz | −Vz | 0 | 0 |

(A-A SECTIONAL VIEW)

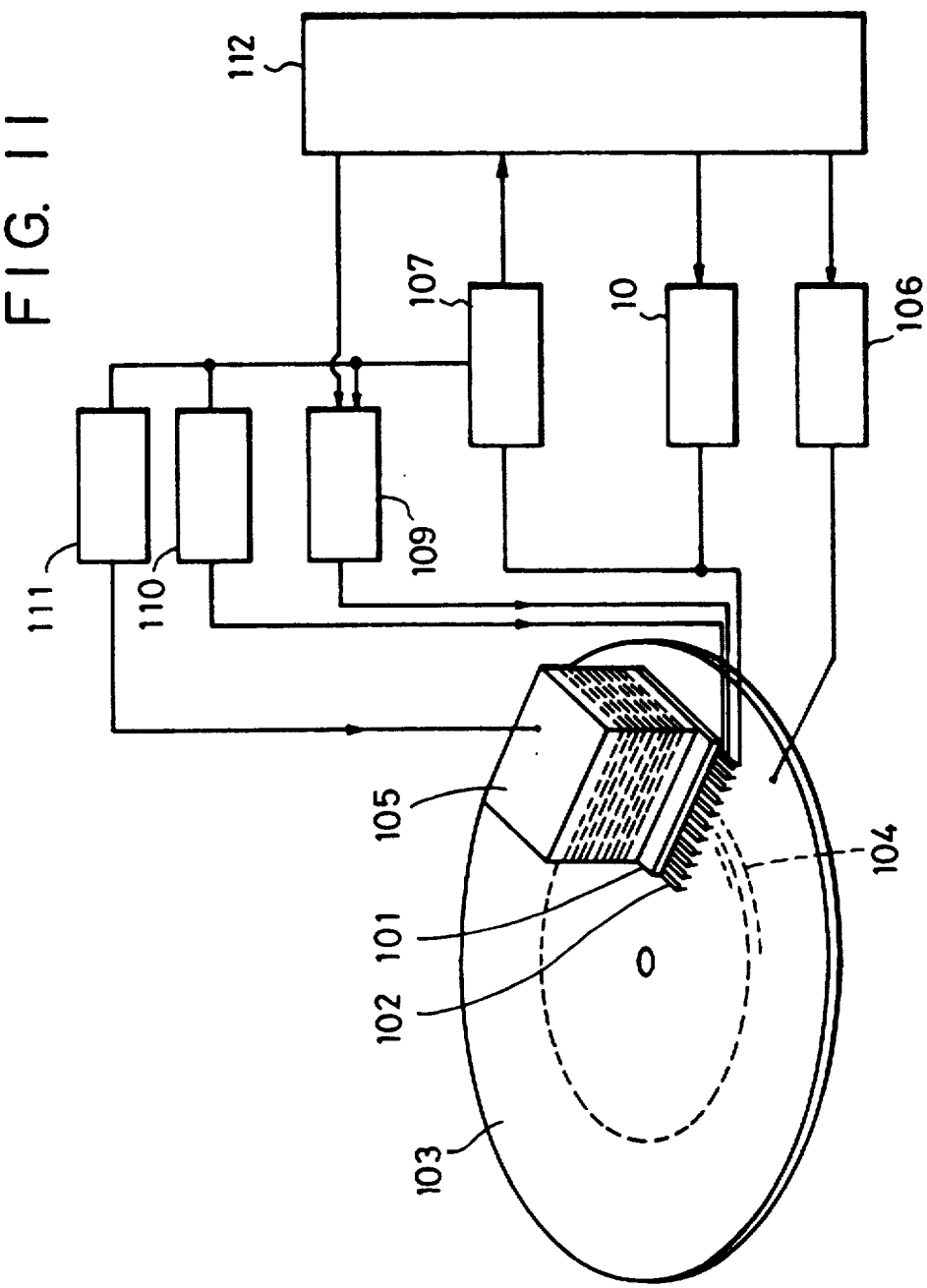

FIG. 13(a)
PRIOR ART
FIG. 13(b)
PRIOR ART
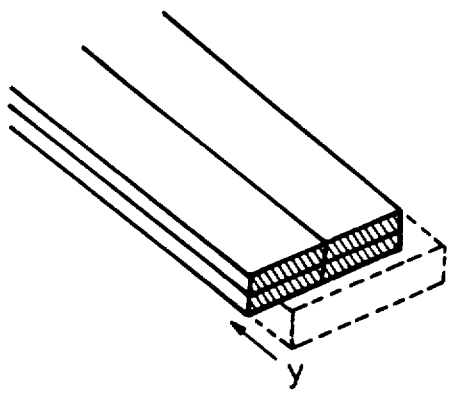
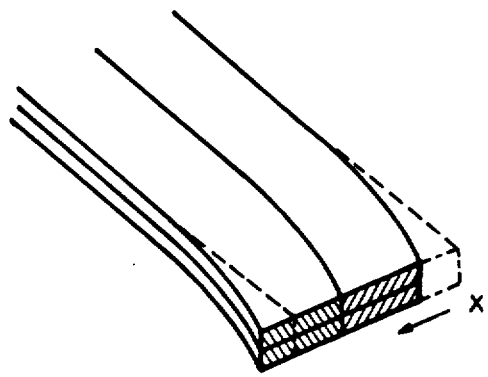
FIG. 13(c)
PRIOR ART
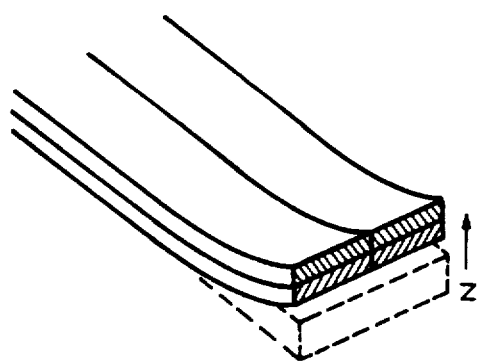

CANTILEVER TYPE PROBE, SCANNING TUNNEL MICROSCOPE AND INFORMATION PROCESSING APPARATUS USING THE SAME

This application is a continuation of application Ser. No. 07/770,335 filed Oct. 3, 1991, now abandoned.

BACKGROUND OF THE INVENTION

1. Field of the Invention

The present invention relates to a cantilever type probe used in a scanning tunnel microscope (STM) and an information recording and reproducing apparatus utilizing the principle of scanning tunneling microscopy.

The present invention also relates to a scanning tunnel microscope and an information processing apparatus which can perform recording, reproducing and erasing of information.

2. Related Background Art

Recently, there has been developed a scanning tunnel microscope with a resolving power on the atomic or molecular order. The concept of STM has been applied to analyze surface structures and to measure surface roughness and the like.

The scanning tunnel microscope (hereinafter abbreviated as STM) is based on the phenomenon that tunnel current changes exponentially dependent upon the distance between a conductive probe and a conductive specimen when they are made to approach each other at a distance of about 1 nm with a voltage applied therebetween.

An image of the surface of a specimen can be obtained utilizing the change of tunnel current caused by the atomic arrangement or uneven structure of the surface of the specimen when a probe, which has a very sharp tip formed by electrolytic polishing and the like, is scanned two-dimensionally while keeping the distance between the probe and the surface of the specimen, which comprises conductive material, constant [G. Binnig et al., Phys. Rev. Lett. Vol 49 (1982) 57]. Moreover, there has been proposed an apparatus capable of high density recording and reproduction by utilizing the principle of STM and a medium which has a surface having a fine, uneven structure or with electrically different portions.

In such an apparatus, it is necessary to scan the specimen using a probe in a range of several nm to several μm. A piezoelectric element is used as a moving mechanism. As examples of such a moving mechanism, there are the tripod type and the cylindrical type. The Tripod type mechanism is one which combines three piezoelectric elements which are perpendicular to each another along the x, y and z directions and a probe which is located on the intersecting point of the three elements.

A cylindrical type mechanism utilizes one end having divided electrodes provided around the peripheral surface of a cylindrical piezoelectric element. A probe is provided on the other end of the divided electrodes which is able to scan, which makes the cylinder bend corresponding to each divided electrode.

Lately, attempts have been made to form a fine cantilever type probe by employing micromechanical techniques utilizing semiconductor processing.

FIG. 12 shows an example of a prior art piezoelectric bimorph cantilever formed on a silicon (Si) substrate by employing a micromechanical technique in accordance with the Proceedings of 4th International Conference on STM/STS, page 317.

FIG. 12(a) is a perspective view of such a cantilever. The cantilever is formed on a silicon substrate by laminating divided electrodes 4a and 4b, ZnO piezoelectric material 5, common electrode 3, ZnO piezoelectric material 5 and divided electrodes 2a and 2b in this order, followed by removing a part of the silicon substrate under the cantilever by anisotropic etching.

The metal probe 7, which is provided on one end of the piezoelectric bimorph cantilever by adhering or the like, can detect tunnel current through a drawing electrode 6.

FIG. 12(b) is a sectional view of the cantilever. The cantilever can be moved three-dimensionally and independently by controlling voltages applied on four regions of piezoelectric material which comprise two regions sandwiched between upper divided electrodes 2a and 2b and common electrode 3 and two regions sandwiched between lower divided electrodes 4a, 4b and common electrode 3.

FIG. 13 (a), (b) and (c) are illustrations showing motions of a prior art cantilever in driving by changing combinations of regions to which voltages are applied within four regions of piezoelectric material divided by pair of divided electrodes.

FIG. 13(a) shows the motion of a cantilever which can move probe 7 toward the y-direction shown in FIG. 12(a) when voltages with the same phase are applied so that four regions can contract simultaneously. FIG. 13(b) shows the motion of a cantilever which can move probe 7 toward the x-direction shown in FIG. 12(a) when an upper and lower region in the right side in FIG. 13(b) stretch and an upper and a lower region in the left side contract. FIG. 13(c) shows the motion of cantilever which can move probe 7 toward the z-direction shown in FIG. 12(a) when a right and a left region in the upper side contract and a right and a left region in the lower side stretch.

In the prior art, however, there has been a problem in that noises by control voltage are induced in probe 7 and drawing electrode 6, because the drawing electrode 6 for probe 7 is placed adjacent to the driving electrodes of the piezoelectric bimorph. Accordingly, noises are overlapped on the fine tunnel current detected, which makes it difficult to obtain precise STM images.

Moreover, in the prior art, there has been a problem that probe 7 runs into a sample surface and the probe is damaged because a feedback control to maintain the distance between the probe and sample is subject to such overlapping noises.

SUMMARY OF THE INVENTION

Accordingly, an object of the present invention is to provide a cantilever type probe capable of reliably detecting information without receiving noise caused by control voltage applied to the driving electrodes of a piezoelectric bimorph structure, an information processing apparatus and a scanning tunnel microscope using the same.

In the first aspect of the present invention, there is provided a cantilever type probe comprising a piezoelectric bimorph cantilever containing a piezoelectric material provided between driving electrodes for driving a cantilever, a probe formed thereon and a drawing electrode for the probe provided along the surface where a probe is formed. A shielding electrode is provided for electrically isolating the probe and the drawing electrode from the driving electrodes.

In the second aspect of the present invention, there is provided a cantilever type probe, where the shielding electrode is provided between (a) the piezoelectric bimorph structure, and (b) the probe and the drawing electrode.

In the third aspect of the present invention, there is provided a cantilever type probe, where the shielding electrode is provided between (a) the driving electrodes and (b) the probe and the drawing electrode wherein a portion of the drawing electrode is provided on the same plane as the probe and the drawing electrode.

In the fourth aspect of the present invention, there is provided a cantilever type probe comprising a piezoelectric bimorph cantilever containing a piezoelectric material provided between driving electrodes for driving a cantilever, a probe formed thereon and a drawing electrode for a probe provided along the surface where the probe is formed where the piezoelectric bimorph structure comprises a laminated piezoelectric material and plurality of driving electrodes, each of which is divided into at least two pieces in each plane, and a common electrode provided opposite to the plurality of driving electrodes at the side of the probe and the drawing electrode.

In the fifth aspect of the present invention, there is provided a cantilever type probe comprising a piezoelectric bimorph structure containing a piezoelectric material sandwiched between three pairs of driving electrodes, each of which is divided in the longitudinal direction of each plane, a probe and a drawing electrode for the probe formed on the same plane as the pair of driving electrodes located on uppermost layer, wherein a first shielding electrode for electrically isolating the probe and the drawing electrode from the driving electrode is provided in the same plane as the pair of driving electrodes located on the intermediate portion of the cantilever and below the plane of the probe and the drawing electrode.

In the sixth aspect of the present invention there is provided a cantilever type probe, wherein there is further provided a second shielding electrode to sandwich the probe and the drawing electrode together with the first shielding electrode.

In the seventh aspect of the present invention, there is provided a cantilever type probe comprising a piezoelectric bimorph cantilever containing a piezoelectric material provided between driving electrodes for driving a cantilever, a probe formed thereon, a drawing electrode for a probe provided along the surface where the probe is formed, and a shielding electrode is provided on an insulating layer to surround the probe.

In the eighth aspect of the present invention, there is provided an information processing apparatus comprising a cantilever type probe of any one described above.

In the ninth aspect of the present invention, there is provided an information processing apparatus comprising a cantilever type probe described in the fourth aspect of the present invention and a means for keeping the common electrode ground potential.

In the tenth aspect of the present invention, there provided a scanning tunnel microscope comprising a cantilever type probe of any one described above.

In the eleventh aspect of the present invention, there provided a scanning tunnel microscope comprising a cantilever type probe described in the fourth aspect of the present invention, and a means for keeping the common electrode ground potential.

BRIEF DESCRIPTION OF THE DRAWINGS

FIG. 11 is a schematic diagram of recording and reproducing apparatus using a cantilever type probe of the present invention;

FIG. 13(a) to (c) are views showing motions of a conventional cantilever type probe.

DETAILED DESCRIPTION OF THE PREFERRED EMBODIMENTS

Figure 1A:
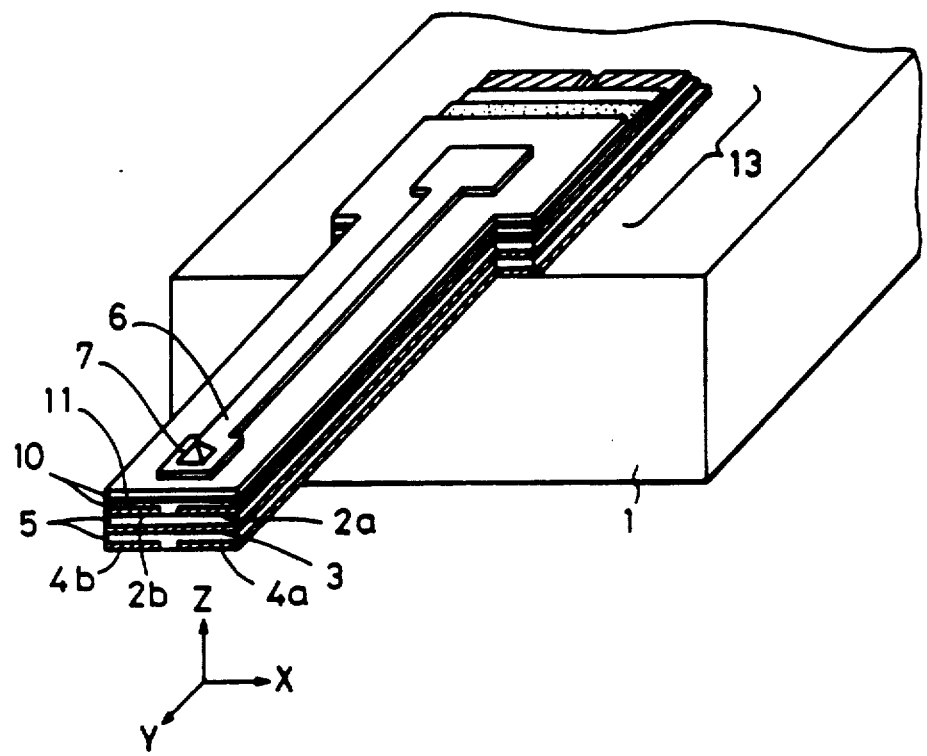
FIG. 1(a) is a perspective view of a cantilever type probe of Example 1 and FIG. 1(b) is a sectional view thereof.

According to the present invention, it is possible to reduce noises induced in a probe and a drawing electrode from driving electrodes and to detect tunnel current with higher signal to noise ratio (S/N) by providing a shielding electrode for electrically isolating driving electrodes from the probe and the drawing electrode contained in a cantilever type probe comprising a cantilever (elastic beam member) a probe and a drawing electrode formed thereon.

The following examples are illustrative only and typify certain preferred embodiments. Other aspects of the invention will be apparent to those skilled in the art.

Example 1

Figure 1B:
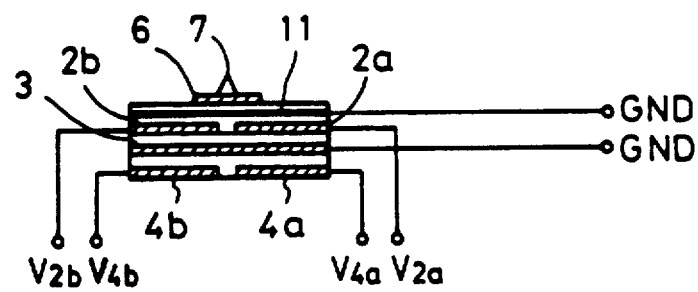

As show in FIGS. 1a and 1b, a cantilever type probe comprises a piezoelectric bimorph cantilever, one end of which is fixed on Si substrate 1 and a probe 7 is formed on the other free end of the cantilever. The piezoelectric bimorph layer comprises (i) divided electrodes 2a and 2b, (ii) piezoelectric layer 5, (iii) common electrode 3, (iv) piezoelectric layer 5 and divided electrodes 4a and 4b.

Each of the electrodes extends to a fixed end of the cantilever where pad portion 13 is provided and is combined with external driving circuit by wire bonding and the like at pad portion 13.

The piezoelectric material includes materials such as ZnO, AlN and the like. These materials can form a film oriented to the c-axis by using magnetron sputtering. The piezoelectric material can be formed using piezoelectric ceramics, such as PZT (Pb(lead) zirconate titannte) and the like. Electrodes are formed by vacuum evaporation using material such as Al, Au, Cr and the like.

A shielding electrode is formed on divided electrodes $2a$ and and $2b$ of the piezoelectric bimorph layer through an insulating layer 10. Probe 7 and drawing electrode 6 are formed thereon through the insulating layer 10. The insulating layer 10 is formed by vacuum evaporation using $SiO_2$, $Si_3N_4$ and the like and probe 7 is formed by adhering a small piece of material such as Pt, Pt-Rh alloy, Pd, W, TiC and the like.

To form the entire cantilever one may form an electrod by vacuum evaporation of silicon. By alternately patterning and sputtering piezoelectric material a piezoelectric bimorph is formed on the Si substrate. An insulating layer 10, a shielding electrode 11 and an insulating layer 10 on divided electrodes $2a$ nd $2b$ is formed thereon. By vacuum evaporation of drawing electrode 6 and patterning and removal of unnecessary portions of the Si substrate by anisotropic etching, the piezoelectric bimorph is configured in the form of a beam.

The function of shielding electrode 11 is explained using FIG. 1($b$).

A piezoelectric bimorph which comprises electrodes $2a$, $2b$, 3, $4a$ and $4b$ and a piezoelectric material 5 is oriented to c-axis in the direction which the piezoelectric material 5 is laminated. Common electrode 3 is connected to ground and driving voltages $V_2a$, $V_2b$, $V_4a$ and $V_4b$ are applied to divided electrodes $2a$, $2b$ and $4a$, $4b$.

By combinations of stretching and contracting in four regions sandwiched between two divided electrodes and the common electrode, the piezoelectric bimorph bends, stretches and contracts. Therefore, probe 7 can independently be driven in the x, y and z direction. In STM, images are obtained by applying a bias voltage between a sample and a probe, detecting tunnel current flowing therebetween and controlling the distance therebetween, based on a value of the tunnel current.

Using a conventional driving mechanism for controlling the distance between probe and sample causes noise between probe 7 and drawing electrode 6 because irregular controlled voltages are applied to divided electrodes $2a$, $2b$, $4a$ and $4b$ of the piezoelectric bimorph.

On the other hand, in the present invention, it is possible to remarkably reduce the noise by providing a shielding electrode 11 between divided electrodes $2a$ and $2b$ and probe 7 and drawing electrode 6 of the piezoelectric bimorph and keeping the shielding electrode at ground potential.

Example 2

The second embodiment of the present invention is illustrated below.

Figure 2:
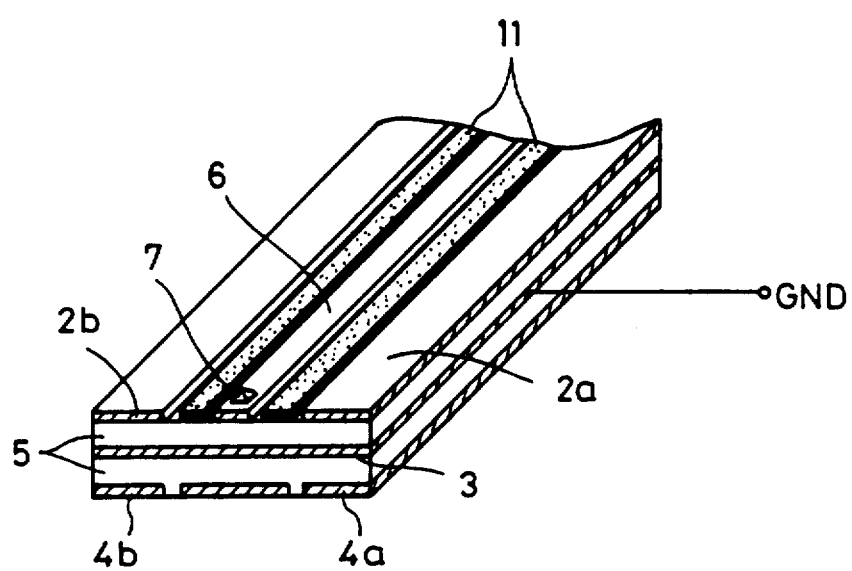
FIG. 2 is a perspective view of a cantilever type probe of Example 2.

FIG. 2 shows a cantilever type probe which comprises probe 7 and drawing electrode 6 provided directly on piezoelectric material 5 between divided electrodes $2a$ and $2b$ of the piezoelectric bimorph and shielding electrodes 11 are provided between drawing electrode 6 and divided electrodes $2a$ and $2b$.

Common electrode 3 of the piezoelectric bimorph is kept at ground potential in the same manner as in Example 1 and shielding electrodes 11, 11 which are provided at both sides of drawing electrode 6 are also kept at ground potential. Therefore, it is possible to reduce noise induced by driving voltages applied to divided electrodes $2a$ and $2b$.

This structure of the piezoelectric bimorph facilitates production because the number of electrode layers and insulating layers is reduced.

Example 3

Figure 3A:
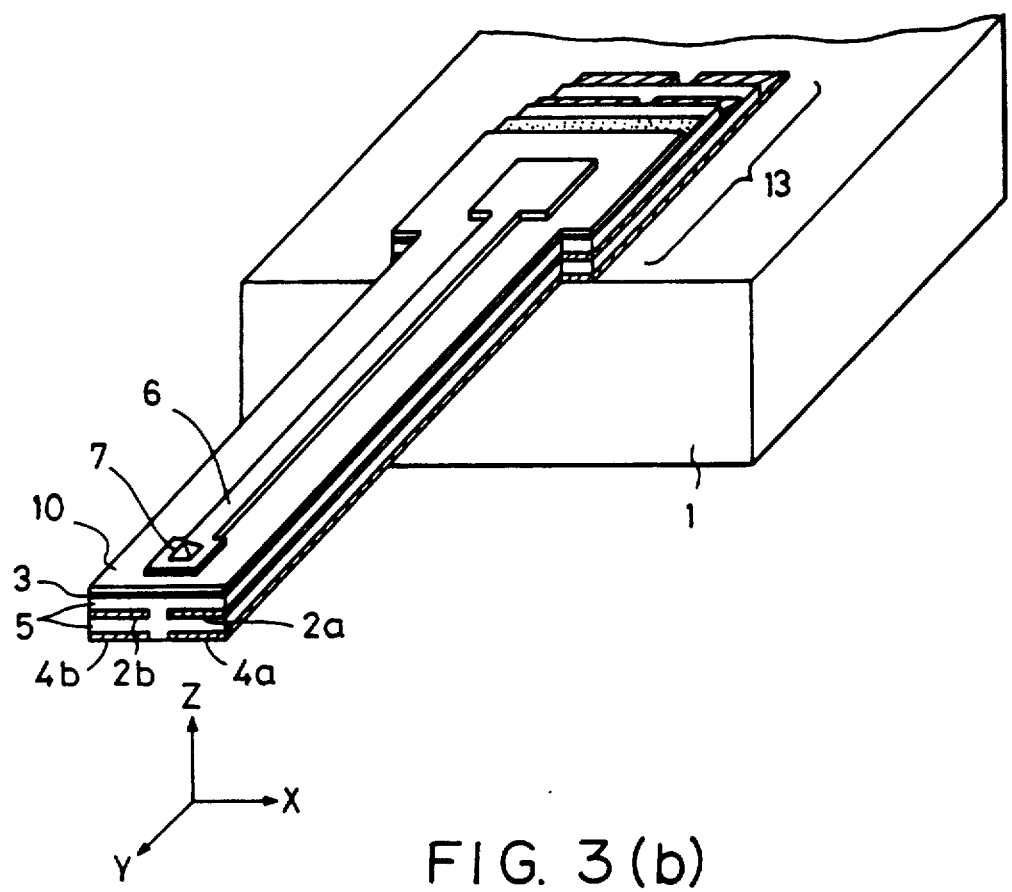
FIG. 3(a) is a perspective view of a cantilever type probe of Example 3 and FIG. 3(b) is a sectional view therof.
Figure 3B:
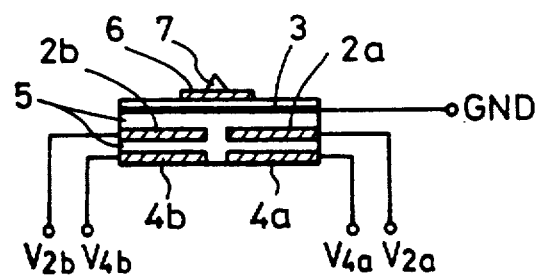

As shown in FIG. 3, another embodiment of the cantilever type probe comprises a piezoelectric bimorph cantilever, one end of which is fixed on Si substrate 1, and probe 7 is formed on the other end of the cantilever.

The piezoelectric bimorph comprises common electrode 3, piezoelectric material 5, divided electrodes $2a$ and $2b$, piezoelectric material 5 and divided electrodes $4a$ and $4b$. Each of the electrodes extends to a fixed end of the cantilever where pad portion 13 is provided, and is combined with external driving circuit by wire bonding at pad portion 13.

The piezoelectric material which is employed includes ZnO, AlN and the like. These materials can form a film oriented to the c-axis by magnetron sputtering. The piezoelectric material can also be formed using a piezoelectric ceramic such as PZT. Useful electrode material includes Al, Au, Cr and the like and electrodes are formed by vacuum evaporation.

An insulating layer 10, including $SiO_2$ or $Si_2N_4$, is provided on common electrode 3 of the piezoelectric bimorph and drawing electrode 6 and probe 7 are provided thereon. Probe 7 is formed by adhering a small piece of electroconductive material such as Pt, Pt-Rh alloy, Pd, W, TiC and the like.

To produce the entire cantilever one can employ an alternate repetition of vacuum evaporation of electrode and patterning, and sputtering of piezoelectric material and patterning to form a piezoelectric bimorph on the Si substrate and removal of unnecessary portions of the Si substrate by anisotropic etching so as to leave the piezoelectric bimorph in the form of a beam. Next, motions and driving method of the cantilever type probe are explained below.

As shown in FIG. 3($b$), where piezoelectric material 5 is formed by magnetron sputtering, the piezoelectric material is film-formed in such a manner that c-axis direction is equal to the direction of the film thickness, as shown with the vertical arrow. Therefore, piezoelectric material 5 can contract or stretch in the direction perpendicular to the c-axis according to plus and minus direction of electric field applied toward the c-axis direction of the piezoelectric material 5.

Four regions of the piezoelectric material which are sandwiched between common electrode 3 and divided electrodes $2a$ and $2b$ and $4a$ and $4b$, can stretch or contract in the direction perpendicular to the c-axis by changing the direction of electric field applied between electrodes. By that combination, the piezoelectric bimorph bends in the x and z directions and stretches or contracts in the y direction. Therefore, probe 7 is driven in the x, y and z directions.

Figures 4A, 4B:
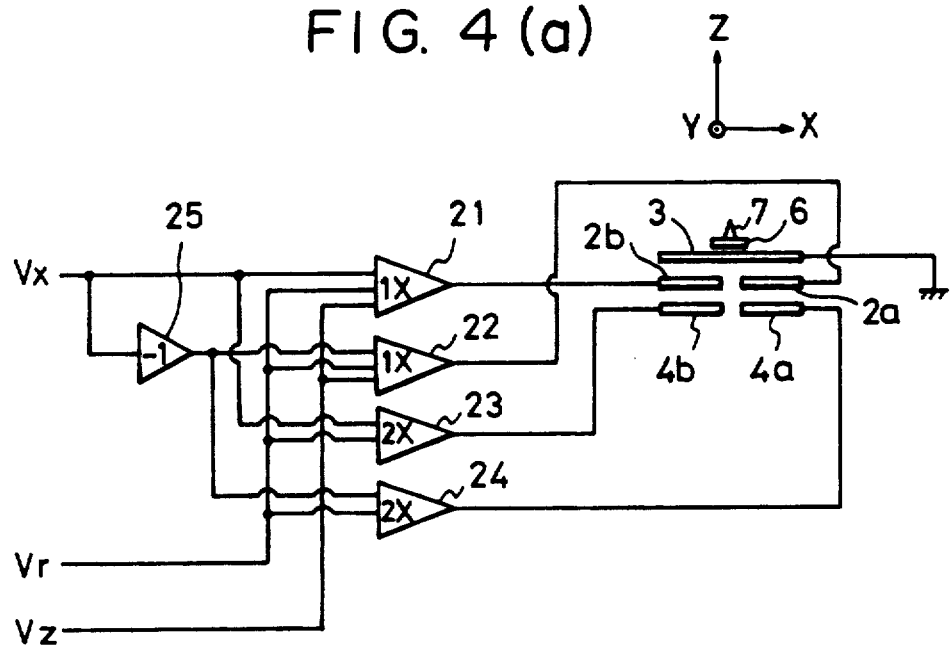
FIG. 4 is a view illustrating a driving method of a cantilever type probe of Example 3.

FIG. 4 shows a circuit which applies driving voltages to each of the electrodes of the piezoelectric bimorph and a combination of the driving voltages. In FIG. 4, 21 and 22 denote adders having single gain, 23 and 24 denote adders having double gain and 25 denotes inverter.

In this driving method, common electrode 3 is always kept at ground potential so that driving voltages applied to divided electrodes $2a$ and $2b$ and $4a$ and $4b$ are not induced as noise toward probe 7 and drawing electrode 6.

Herein, in order to drive probe 7 in the x direction, it is necessary to apply voltage −Vx to electrode 2a so as to have potential difference −Vx between common electrode 3 and electrode 2a, and to apply voltage −2Vx to electrode 4a so as to have potential difference −Vx between electrode 2a and electrode 4a. Similarly it is necessary to apply voltage Vx to electrode 2b and to apply voltage 2Vx to electrode 4b. By doing so, the right side of piezoelectric material sandwiched between common electrode 3 and electrodes 2a, 4b contracts and the left side of the piezoelectric material sandwiched between common electrode 3 and electrodes 2b, 4b stretches. In this manner, the piezoelectric bimorph bends in the x direction shown in FIG. 4.

Once a voltage Vx for driving probe 7 in the x direction is applied to a circuit, voltage Vx is applied to electrode 2b through adder 21, voltage −Vx is applied to electrode 2a through inverter 25 and adder 22, voltage 2Vx is applied to electrode 4b through double adder 23, and voltage −2Vx is applied to electrode 4a through inverter 25 and double adder 24.

In order to drive probe 7 in the y direction, it is necessary to apply voltage Vy to electrode 2a, 2b so as to have potential difference Vy between common electrode 3 and electrodes 2a, 2b, and to apply voltage 2Vy to electrodes 4a, 4b so as to have potential difference Vy between electrodes 2a, 2b and electrodes 4a, 4b. By doing so, the piezoelectric material sandwiched between each electrode is stretched by the same amount, and therefore, the piezoelectric bimorph stretches in the y direction.

In order to drive probe 7 in the z direction, it is necessary to apply voltage −Vz to electrodes 2a, 2b so as to have potential difference −Vz between common electrode 3 and electrode 2a, 2b, and to apply voltage (−Vz+Vz=0) to electrodes 4a, 4b so as to have potential difference Vz between electrodes 2a, 2b and electrodes 4a, 4b. By doing so, the upper side of the piezoelectric material sandwiched between common electrode 3 and electrodes 2a, 2b contracts and the lower side of the piezoelectric material sandwiched between electrodes 2a, 2b and electrodes 4a, 4b stretches. Therefore, the piezoelectric bimorph bends in the z direction shown in FIG. 4. By adding each of the driving voltages Vx, Vy and Vz to adders 21, 22, 23 and 24 and applying each of driving voltages to each electrodes 2a, 2b, 4a and 4b, probe 7 can be driven simultaneously in x, y and z direction.

Example 4

Figure 5A:
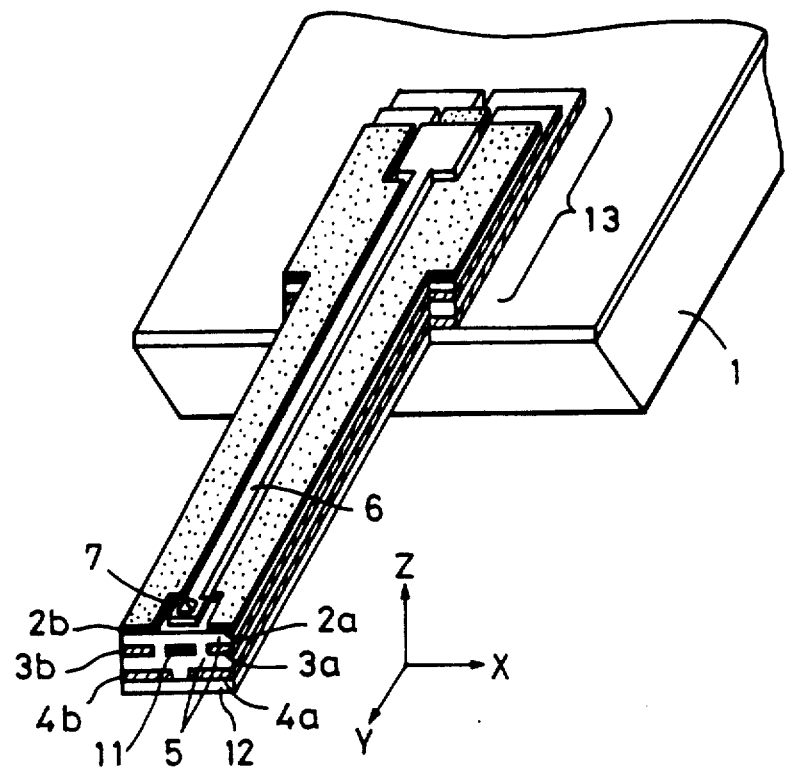
FIG. 5(a) is a perspective view of a cantilever type probe of Example 4 and FIG. 5(b) is a sectional view thereof.

As shown in FIG. 5(a), in this embodiment the cantilever comprises a piezoelectric bimorph, one end of which is fixed on substrate 1, and a probe 7 formed on the free end of the cantilever. The cantilever has a structure which comprises a protective layer 12, the third pair of divided driving electrodes (4a, 4b), a piezoelectric layer 5, the second pair of divided driving electrodes (3a, 3b), a piezoelectric layer 5 and the first pair of divided driving electrodes (2a, 2b). Each of the electrodes extends to a fixed end of the cantilever where a pad portion is provided, and is combined with external driving circuit by wire bonding and the like at pad portion 13. Moreover, a drawing electrode 6 is provided in the same plane where the first divided driving electrodes are provided, and a probe 7 is provided on the drawing electrode 6.

A shielding electrode 11 is provided in the same plane where the second divided driving electrodes are provided. The shielding electrode 11 is placed so as to overlap with the drawing electrode 6 and the width of the shielding electrode is preferably larger than that of the drawing electrode 6. The width of the drawing electrode 6 may be any size providing it is possible to take out a signal current and may preferably be more than 5 μm.

Substrate 1 includes a wafer of semiconductive crystal such as Si, GaAs and the like. Protective layer 12 includes $Si_3N_4$, $SiO_2$, amorphous Si-N-H and the like formed by Low Pressure Chemical Vapor Deposition (LPCVD) or plasma CVD. Materials of piezoelectric layer 5 include piezoelectric materials such as ZnO, AlN, $TiBaO_3$, PZT and the like. These materials are used such that crystals are oriented to the c-axis, perpendicular to the substrate.

C-axis orientation depends on the degree of crystallinity of driving electrodes 3a, 3b, 4a and 4b which correspond to base electrodes. Therefore, materials should be carefully selected. Materials having larger c-axis orientation may be preferred. Methods of forming this kind of film include sputtering (magnetron sputtering), chemical vapor deposition (CVD), physical vapor deposition (PVD) and the like. Materials of driving electrodes 2a, 2b, 3a, 3b, 4a and 4b include Au, Al, Cr, Mo, W, Ti, Cu and the like or a lamination of these materials.

Materials of shielding electrode 11 preferably include the same materials as that of the second divided driving electrodes 3a, 3b (except in a special case), because shielding electrode 11 is provided on the same plane as driving electrodes 3a, 3b.

Materials of drawing electrode 6 preferably include the same materials as that of the first divided driving electrodes 2a, 2b (except in a special case), because drawing electrode 6 is provided on the same plane as driving electrodes 2a, 2b.

Methods for forming electrodes include vapor evaporation by sputtering or electron beam, CVD and the like. Materials of probe 7, which is provided on drawing electrode 6, include Pt, Pd, W, TiC, Au, Cu, Cr, Si and the like.

Next, a process of producing the entire cantilever is briefly explained.

Protective layer 12 is formed on Si substrate and the third driving electrode 4 is vapor-deposited, followed by dividing the driving electrode into two electrodes 4a, 4b using a photolithographic process.

Next, piezoelectric layer 5 is formed by magnetron sputtering method, followed by forming the second driving electrode 3 and shielding electrode layer 11 and forming electrodes 3a, 3b, 11 by dividing electrodes using a photolithographic process.

Piezoelectric layer 5 is formed thereon by a magnetron sputtering method, and the first driving electrode 2 and drawing electrode layer 6 are formed at the upper portion, followed by forming each of electrodes 2a, 2b and 6 using a photolithographic method. A material of probe 7 is deposited on the drawing electrode 6 and probe 7 is formed by a photolithographic method so as to make a probe of a desired height and shape. Finally, the piezoelectric bimorph is formed by removing unnecessary portions of the Si substrate by anisotropic etching so as to leave piezoelectric bimorph in a shape of a beam.

In this Example, a Si₃N₄ layer 5000 Å thick is formed on a wafer of Si substrate with (100) face by LPCVD, followed by providing an opening in the Si₃N₄ film on one side of wafer by reactive ion etching method using CF₄ photolithography.

A gold electrode 1000 Å thick and a ZnO layer 3000 Å thick are formed alternatively on the Si₃N₄ layer.

After depositing each layer, a pattern is formed using photolithography and etching to form a structure with the shape of the electrodes shown in FIG. 5(a). After the upper portion is protected by plasma depositing on a-Si:N:H film, the cantilever is formed by removing Si under wafer using anisotropic etching. After removing the upper protective film, a probe is provided on the tip portion of the cantilever to complete the desired cantilever type probe.

Figure 5B:
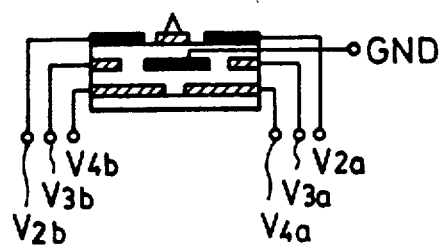

The motion of the cantilever type probe is explained using FIG. 5(b).

Piezoelectric bimorph which comprises driving electrodes 2a, 2b, 3a, 3b, 4a and 4b, and piezoelectric material 5, is oriented to x-axis in the direction which piezoelectric material 5 is laminated. Voltages V2a, V2b applied to the first divided driving electrodes 2a, 2b, which are located on the upper surface, are kept at ground.

Voltages V3a, V3b are applied to the second divided driving electrodes 3a, 3b which are located on the intermediate portion. Voltages V4a, V4b are applied to the third divided driving electrodes 4a, 4b which are located on the bottom surface. The same voltages as in Example 3 are applied to the second divided electrodes 3a, 3b and the third divided electrodes 4a, 4b.

Piezoelectric bimorph can bend, stretch or contract by a combination of stretching or contracting of four regions of piezoelectric material 5 which is sandwiched between the first divided driving electrodes 2a, 2b, the third divided driving electrodes 4a, 4b and the intermediate divided driving electrodes 3a, 3b. Therefore, probe 7 can be driven in the direction of x, y, z-axis, easily, independently and stably.

In STM, images are obtained by applying a bias voltage between a specimen and probe 7, detecting tunnel current flowing therebetween and controlling the distance therebetween.

When the piezoelectric bimorph is used as a driving mechanism for controlling the distance between a probe and a specimen, noises may be easily induced to probe 7 and drawing electrode 6 (which detect fine tunnel current), because irregular control voltages are applied to the second divided driving electrodes 3a, 3b and the third divided driving electrodes 4a, 4b of piezoelectric bimorph.

Therefore, by providing shielding electrode 11 between drawing electrode 6 and the third divided driving electrodes 4a, 4b, and keeping shielding electrode at ground, shielding electrode 11 works as shield with the first divided driving electrodes 2a, 2b and inducement of noises can be effectively reduced.

While keeping the first divided electrodes 2a, 2b and shielding electrode 11 at ground and flowing DC current of 10 nA to the probe, AC voltage with 5 to 10 V is applied to the second divided driving electrodes 3a, 3b and the third divided driving electrodes 4a, 4b with change of frequency. As a result, current value in probe 7 is not affected by noises.

According to the present Example, a cantilever type probe can be easily produced without increasing the number of laminated layers.

Example 5

Figure 6:
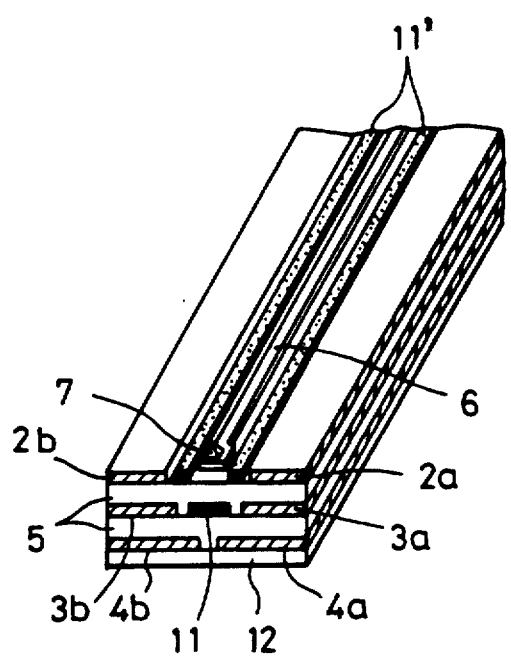
FIG. 6 is a perspective view of a cantilever type probe of Example 5.

In this Example, a cantilever type probe is used, in which another shielding electrode 11' is added to cantilever type probe used in Example 4, so as to sandwich drawing electrode 6 in the same plane as the first divided driving electrodes 2a, 2b and is kept at ground, as shown in FIG. 6.

In this case, the upper divided electrodes 2a, 2b are not necessarily kept at ground, because shielding electrode 11' shields drawing electrode 6 and probe 7.

In this Example, when the space between drawing electrode 6 and shielding electrode 11' is set to 1.5 μm, the noise induced by the first divided driving electrodes 2a, 2b is completely reduced, a signal can be stably taken out and the cantilever with probe can be stably and independently scanned along the surface shape of the specimen.

Example 6

Figure 7A:
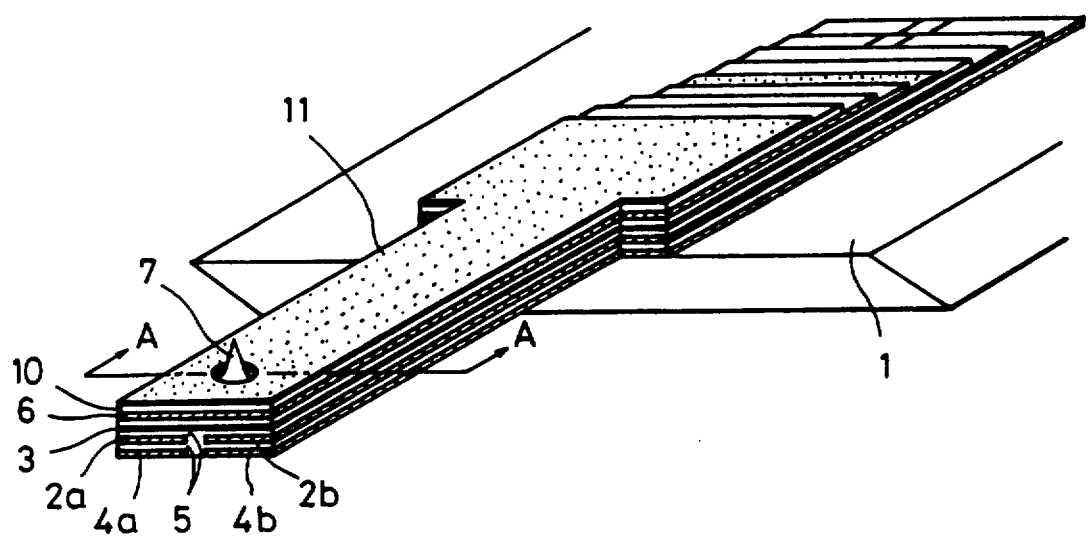
FIG. 7(a) is a perspective view of a cantilever type probe of Example 6 and FIG. 7(b) is a sectional view thing.
Figure 7B:
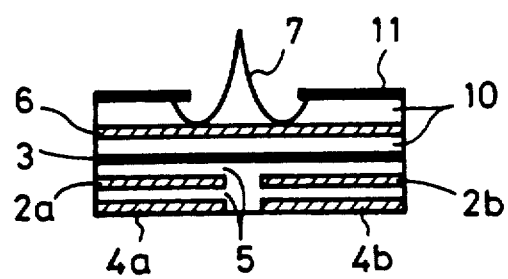

FIG. 7(a) is a perspective view of a cantilever type probe of another embodiment of the present invention and FIG. 7(b) is the sectional view in the A—A face.

In this Example, as shown in FIG. 7(a), the cantilever comprises a piezoelectric bimorph, one end of which is fixed on the Si substrate and probe 7 is formed on the other end of the cantilever. The piezoelectric bimorph layer comprises divided electrodes 4a, 4b, piezoelectric layer 5, divided electrodes 2a, 2b, piezoelectric layer 5 and common electrode 3.

On the uppermost piezoelectric bimorph layer, insulating layer 10, drawing electrode 6, insulating layer 10 and shielding electrode 11 are formed. Piezoelectric bimorph is driven by keeping common electrode 3 at ground potential and by changing the voltage applied to divided electrode in the same manner as in Example 3.

This Example is characterized in that shielding electrode 11 is provided on the entire upper surface except the region in which probe 7 is provided. By this feature, probe 7 and drawing electrode 6 are surrounded by shielding electrode 11 and common electrode 3, and more complete shielding is possible.

A process of producing the entire cantilever includes the repetition of vapor evaporation of a bottom electrode and patterning on the Si substrate, and vapor evaporation of piezoelectric material by sputtering and patterning to form the piezoelectric bimorph, the repetition of vapor evaporation and patterning of the insulating layer, drawing electrode, insulating layer and shielding electrode.

Figure 8A:
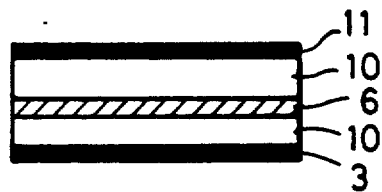
FIG. 8 is a view showing a process for making a cantilever type probe shown in FIG. 7.
Figure 8B:
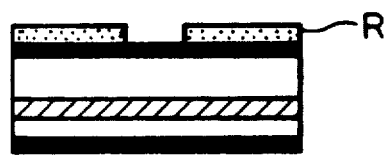
Figure 8C:
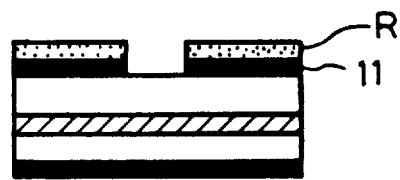
Figure 8D:
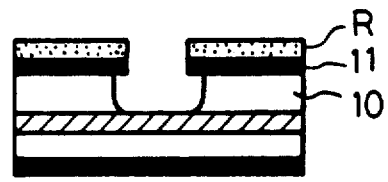
Figure 8E:
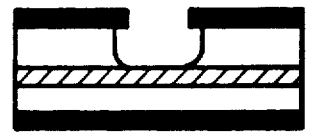

FIG. 8(a) shows the structure of the cantilever obtained above. For simplicity, a part of the piezoelectric bimorph layer is omitted. For this structure, resist R is provided by lithography (FIG. 8(b)), followed by removing a part of shielding electrode 11 by etching with potassium iodide (FIG. 8(c)). Then, a part of SiO₂ insulating layer 10 is removed with fluoric acid solution (FIG. 8(d)), followed by removing resist R (FIG. 8(e)).

Figure 9:
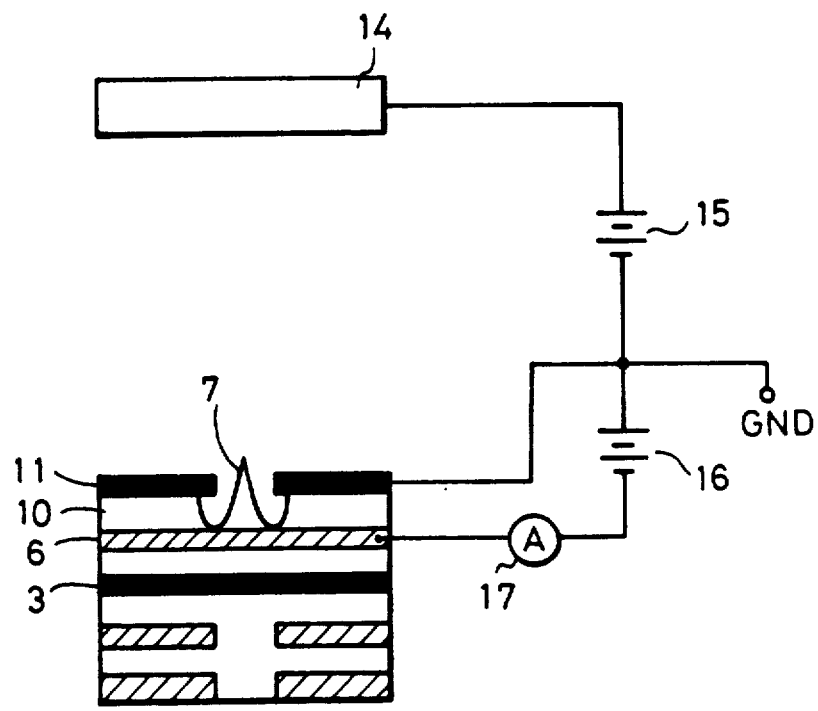
FIG. 9 is a schematic diagram of electrodeposition apparatus used in forming a cantilever type probe FIG. 7.

Next, probe 7 is formed using an electrodeposition method. FIG. 9 is a schematic view of electrodeposition method used in this Example.

In FIG. 9, 14 denotes an electrode consisting of platinum 15 and 16 denote DC power supplys for electrodeposition and 17 denotes an ammeter. Drawing electrode 6 and shielding electrode 11 are respectively wired as shown in FIG. 9. Anode 14 consisting of Pt and cantilever portion are immersed in gold sulfite plating solution (trade name: Neutronecs 309, available from ELEC- TROPLATING ENGINEERS OF JAPAN LTD., Nihonbashi, Chuhoh-ku, Tokyo, Japan), followed by applying a voltage of about IV to power supply 16 to adjust power supply 15 so as to provide a reading of 1 mA/Cm² in ammeter 17. In this manner, probe 7 is formed.

After conducting the steps described above, an unnecessary portion of Si substrate is removed by anisotropic etching to form the cantilever type probe.

STM image is observed using this type of cantilever type probe. As a result, a clear image with little noise is obtained.

Example 7

Scanning Tunnel Microscope (STM) using a cantilever type probe described in one of Example 1 to 7 is explained herein.

Figure 10:
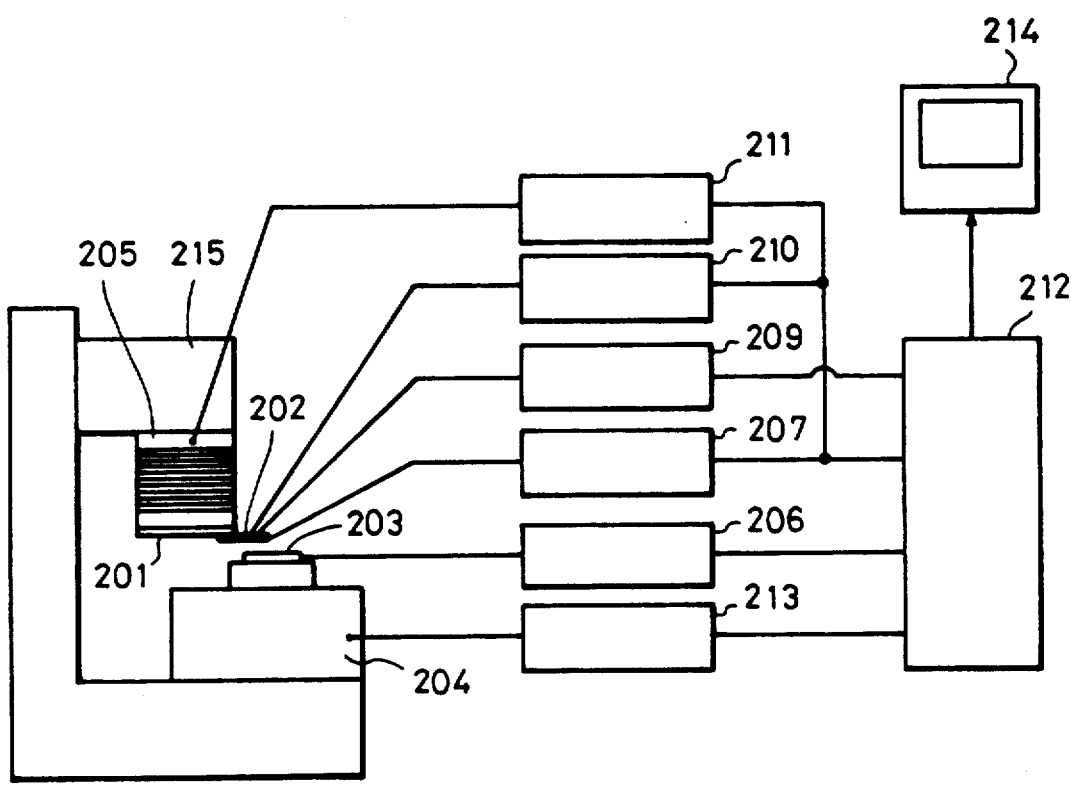
FIG. 10 is a schematic diagram of STM using a cantilever type probe of the present invention.
Figure 12A:
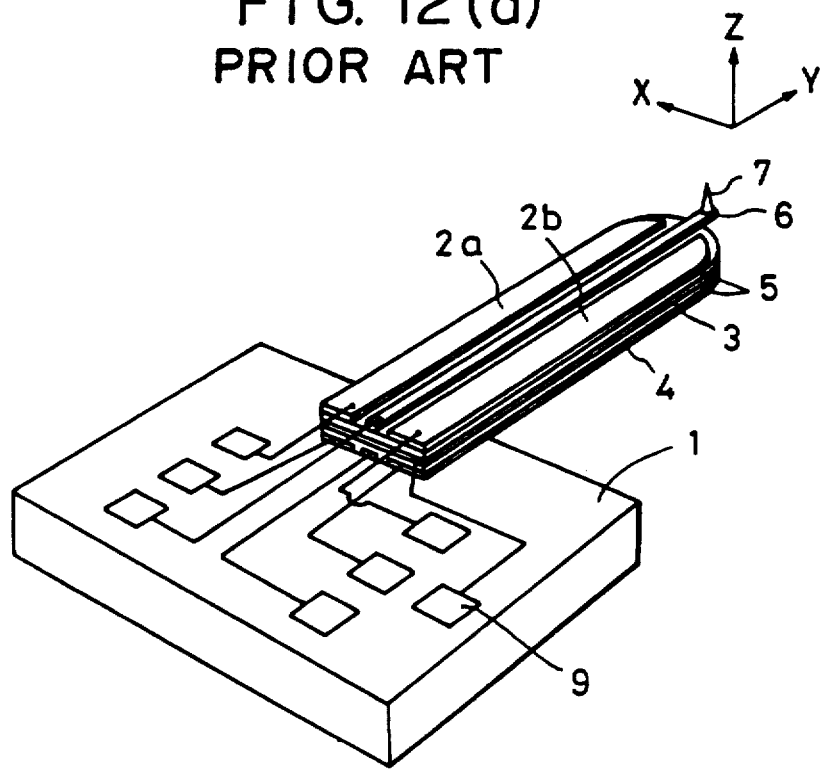
FIG. 12(a) is a perspective view of a cantilever type probe of the prior art and FIG. 12(b) is a sectional view thereof.
Figure 12B:
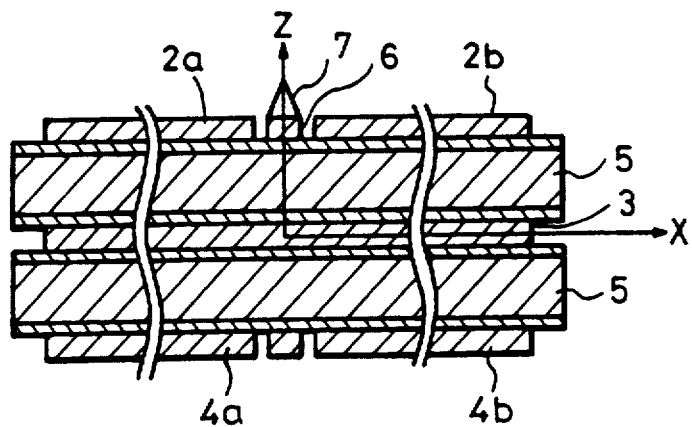

FIG. 10 is a schematic view of a STM of the present invention. In FIG. 10, 201 is a silicon substrate on which cantilever type probe of the present invention is formed. 205 is piezoelectric element for coarse movement which drives silicon substrate 201 in the z direction. 215 is a driving mechanism which controls movement of piezoelectric element for coarse movement 205 and cantilever type probe 202 close to the sample surface. 203 is sample for observation and 204 is an xy fine movement mechanism which causes sample 203 to move with fine control in the x,y direction.

Motion of the STM is explained as follows:

Cantilever type probe 202 is brought close to a surface of sample 203 so as to put probe 202 under control of piezoelectric element for coarse movement 205 by working approaching mechanism 215 which consists of stage movable in the z direction by hand or by motor.

The approach is halted by monitoring the distance either by using a microscope or the like, or by automatic control using a servo-mechanism to propel cantilever type probe 202 and detecting current flow between the probe and the sample.

At sample 203, tunnel current flowing between sample 203 and the probe (to which a bias voltage is applied by bias circuit 206) is detected by tunnel current detecting circuit 207. Motion of cantilever type probe 202 in the z direction is controlled through z direction servo circuit 210.

That is, by scanning cantilever type probe 202 in the xy direction using xy scanning circuit 209, while controlling cantilever type probe 202 through low-pass filter at z direction by servo circuit 210 so as to keep the mean distance between the probe and the surface of specimen constant, the tunnel current is changed according to the fine unevenness of the sample surface. By monitoring the tunnel current in control circuit 212 and treating it in synchronization to the xy scanning signal, an STM image with a constant height mode is obtained. The STM image is shown on display 214 by image processing, such as two-dimensional FFT.

At that time, if the temperature drift in the apparatus or the unevenness or slope of the surface of sample 203 are large, cantilever type probe 202 cannot follow the change because the stroke of cantilever probe 202 in the z direction is small. Therefore, control is accomplished so as to follow slow motions by passing a signal from tunnel current detecting circuit 207 through driving circuit for z-direction coarse movement 211 by using piezoelectric element for coarse movement and by making feedback of band width 0.01 to 0.1 Hz.

The scanning range of in the xy directions of cantilever probe 202 is narrow. Therefore, observation is made by moving xy fine movement mechanism for sample 204 in the xy directions using driving circuit for xy fine movement 213 and by bringing the probe into a desired region.

In this type of STM it is possible to reduce noise induced to the probe and the drawing electrode from driving electrodes and to detect tunnel current with higher S/N values by using a cantilever probe which contains the electrode structure shown in the above Example and the driving method thereof.

Example 8

A recording-reproducing appratus having a plurality of cantilever probes described in any one of Examples 1 to 6 is explained in this Example.

FIG. 11 is a schematic view of a recording-reproducing apparatus of the present invention.

In FIG. 11, 101 is a silicon substrate on which a plurality of cantilever probes of the present invention are provided, 105 is piezoelectric element for coarse movement which can drive the silicon substrate 101 in the z direction, 103 is circular recording medium and 104 is data line comprising recording bits. Recording medium 103 is rotated so as to keep its angular velocity constant by motion (not shown) and data line 104 is recorded concentrically. Cantilever probe 102 and piezoelectric element for coarse movement 105 are constituted so as to be able to move in the radius direction of recording medium 103 by a linear motor movement mechanism (not shown), and can access arbitrary data lines and perform recording-reproducing of data. At that time, access to a desired data line is conducted by position detecting apparatus such as a linear encoder and each of cantilever probes 102 is controlled so as to follow an objective data line.

Recording medium 103 comprises, for example, a thin film having an electric memory effect such as (i) a recording layer comprising an organic compound with a $\pi$ electron system or chalcogenites and (ii) an electroconductive substrate. Recording is performed by applying voltage exceeding a predetermined threshold between the probe and the electroconductive substrate to cause a characteristic change over a minute region in the recording layer beneath the probe. Reproducing is performed by utilizing the difference of tunnel current flowing between the probe and the recording layer at a recorded portion and an unrecorded portion.

Recording medium 103 includes an epitaxial growth surface of Au or cleavage surface of graphite formed on a substrate having a smooth surface such as glass, mica and the like, and two layers of monomolecular film comprising squarilium-bis-6-octylazulene (SOAZ) provided thereon by the well known Langmuir-Blodgett method.

In this case, when voltage applied between probe and recording layer does not exceed the threshold voltage which causes electric memory effect, for example, tunnel current is less than $10^{-11}$ A, then the recording layer maintains the OFF-state. On the other hand, when voltage is applied, after applying a pulse voltage with a triangular wave exceeding the threshold voltage, current with $10^{-7}$ A flows and the recording layer changes into the ON state and recording is performed. When voltage is applied after applying a reverse pulse with triangular wave exceeding the threshold voltage which changes the ON-state into OFF state, the current is less than $10^{-11}$ A and the recording layer changes into the OFF-state and recording data is erased.

Next, motion of recording-reproducing apparatus is explained.

Recording is performed by moving the piezoelectric element for z-direction coarse movement 105 and cantilever probe 102 to a recording position using the movement mechanism and by applying voltage exceeding the threshold voltage to recording medium 103. At that time, bias voltage is applied to recording medium 103 using bias circuit 106 and probe 7 is kept at the distance which allows tunnel current to flow to recording medium 103.

The approach is conducted by bringing probe 7 close to the recording medium using the electric element for z-direction coarse movement 105, followed by drawing each probe into tunnel region using the plurality of cantilever probes 102.

The drawing of probes is conducted by performing feedback of tunnel current, which is detected by tunnel current detecting circuit 107 corresponding to each probe, through z-direction servo circuit 110 of each cantilever probe 102, while controlling the distance between each probe and recording medium to be constant. A low-pass filter is provided in z-direction servo circuit 110, cut-off frequency is selected not to follow a data signal, but to follow the surface undulation of recording medium 103 and the average distance between probe and recording medium is controlled to be constant.

Recording is performed by sending a recording signal to pulse applying circuit 108 from controlling circuit 112 and applying it to each probe as pulse voltages.

At that time, driving voltage for cantilever probe 102 is kept constant while applying pulse voltage by providing hold circuit in z-direction servo circuit 110 to prevent the change of the distance between probe and recording medium caused by pulse application.

Reproducing is performed by moving the probe above a desired data line by using the movement mechanism and by detecting the amount of the change of tunnel current between the probe and the surface of recording medium 103 in a recorded portion and an unrecorded portion by using the probe.

In a case of recording data line, only position detection is made by the position detecting apparatus in the movement mechanism. Therefore, data line is recorded in a finely undulated state by influence of temperature drift of the apparatus and vibration from outside. In a case of reproducing data line, the same influence as above is affected. So, the probe cannot be moved above the data line, only by using position detection of position detecting apparatus in movement mechanism and S/N at data reproduction tends to decrease.

Then, cantilever probe 102 is controlled in the direction perpendicular to data line so as to be able to reproduce, following the data line when the probe is moved above a desired data line by using movement mechanism.

Each of cantilever probes 102 is controlled by track servo circuit 109 so as to make the reproducing signal of data line from tunnel current detecting circuit 107, maximum. Reproducing signal of data line from tunnel current detecting circuit 107 is treated in controlling circuit 112, which makes reproducing possible.

Erasing is performed by moving the probe above the data line to be deleted in the same manner as in a case of recording, and by applying erasing pulse voltage opposite to recording pulse voltage by pulse applying circuit 108.

At that time, the distance between probe and recording medium is kept constant by hold circuit in z-direction servo circuit 110.

In this Example, the present invention is explained using circular recording medium. But recording-reproducing may be performed by using flat recording medium and moving cantilever probe relative to recording medium using XY movement mechanism.

In this type of recording-reproducing apparatus, it is possible to reduce noise induced in the probe and drawing electrode from the driving electrode by using the same electrode structure of probe and the same driving method as in the above Example, and to obtain reproducing signal with higher S/N.

As described above, it is possible to reduce noise induced to the probe and drawing electrode from driving electrode and to detect tunnel current with higher S/N by providing a shielding electrode between the driving electrode, and drawing electrode and probe in the cantilever probe having piezoelectric bimorph structure.

It is also possible to reduce noise induced to the probe and drawing electrode from the driving electrode and to detect tunnel current with higher S/N by using a driving method, in which the driving electrode located at the side of the probe and drawing electrode is made common electrode and the potential is kept at ground potential in the driving circuit.

A typical STM apparatus employing a recording layer with electric memory effect is disclosed in Application Ser. No. 07/136,728, filed Dec. 22, 1987 which is incorporated herein by reference.

This invention is not to be limited to the concept as set forth in the following claims.

What is claimed is:

1. A cantilever probe, comprising:
   a piezoelectric bimorph cantilever, said cantilever containing a plurality of driving electrodes for receiving driving signals and a piezoelectric material provided between three pairs of said driving electrodes each of which is divided in the longitudinal direction of a corresponding plane; and
   a probe and a drawing electrode for the probe formed on a common plane as one of the three pairs of driving electrodes which is located on an uppermost layer,
   wherein a first shielding electrode which electrically isolates the probe member and the drawing electrode from the driving electrode is provided in the same plane as another one of the three pairs of driving electrodes which are located on an intermediate portion of the cantilever and below the common plane of the probe and the drawing electrode.

2. A cantilever probe according to claim 1, wherein there is further provided a second shielding electrode to sandwich the probe and the drawing electrode together with the first shielding electrode.

3. An information processing apparatus comprising a cantilever probe, comprising:
   a piezoelectric bimorph cantilever, said cantilever containing a plurality of driving electrodes for receiving driving signals and a piezoelectric material provided between three pairs of said driving electrodes each of which is divided in the longitudinal direction of a corresponding plane; and a probe and a drawing electrode for the probe formed on a common plane as one of the three pairs of driving electrodes which is located on an uppermost layer, wherein a first shielding electrode which electrically isolates the probe member and the drawing electrode from the driving electrode is provided in the same plane as another one of the three pairs of driving electrodes which are located on an intermediate portion of the cantilever and below the common plane of the probe and the drawing electrode.

4. An information processing apparatus comprising a cantilever probe according to claim 3, wherein there is further provided a second shielding electrode to sandwich the probe and the drawing electrode together with the first shielding electrode.

* * * * *

UNITED STATES PATENT AND TRADEMARK OFFICE
CERTIFICATE OF CORRECTION

PATENT NO. : 5,321,685
DATED : June 14, 1994
INVENTOR(S) : HIROYASU NOSE ET AL.

It is certified that error appears in the above-identified patent and that said Letters Patent is hereby corrected as shown below:

On title page,
AT [75] INVENTORS

"Yuki Kasanuki" should read --Yuji Kasanuki--.

AT [56] REFERENCES CITED

Foreign Patent Documents,
"2091836   3/1990   Japan" should read
--2-91836   3/1990   Japan--.

COLUMN 2

Line 26, "pair" should read --a pair--.

COLUMN 3

Line 64, "provided" should read --is provided--.
Line 67, "provided" should read --is provided--.

COLUMN 4

Line 22, "thing;" should read --thereof;--.
Line 26, "probe" should read --probe shown in--.
Line 48, "member) a" should read --member), a--.
Line 55, "FIGS. 1a and 1b," should read
        --FIGS. 1(a) and 1(b),--.

UNITED STATES PATENT AND TRADEMARK OFFICE
CERTIFICATE OF CORRECTION

PATENT NO. : 5,321,685
DATED : June 14, 1994
INVENTOR(S) : HIROYASU NOSE ET AL.

It is certified that error appears in the above-identified patent and that said Letters Patent is hereby corrected as shown below:

COLUMN 5

Line 4, "tannte)" should read --tanate--.
Line 8, "and and" should read --and--.
Line 20, "nd" should read --and--.
Line 38, "z direction." should read --z directions.--.

COLUMN 6

Line 27, "$Si_2N_4$," should read --$Si_3N_4$,--.

COLUMN 7

Line 25, "electrode 2a, 2b" should read --electrodes 2a, 2b--.
Line 37, "electrode 2a, 2b," should read --electrodes 2a, 2b,--.
Line 50, "z direction." should read --z directions.--.

COLUMN 8

Line 7, "providing" should read --provided--.

COLUMN 9

Line 7, "alternatively" should read --alternately--.
Line 22, "Voltages V2a, V2b" should rad "Voltages $V_{2a}$, $V_{2b}$--.

UNITED STATES PATENT AND TRADEMARK OFFICE
CERTIFICATE OF CORRECTION

PATENT NO. : 5,321,685

DATED : June 14, 1994

INVENTOR(S) : HIROYASU NOSE ET AL.

It is certified that error appears in the above-identified patent and that said Letters Patent is hereby corrected as shown below:

COLUMN 10

Line 63, "num 15" should read --num, 15-- and "supplys" should read --supplies--.

COLUMN 11

Line 3, "IV" should read --1V--.

COLUMN 12

Line 1, "of in" should read --in--.

COLUMN 13

Line 51, "is affected." should read --occurs.--.

Signed and Sealed this

Sixteenth Day of May, 1995

Attest:

BRUCE LEHMAN

Attesting Officer     Commissioner of Patents and Trademarks